Jan. 4, 1944.       K. HENKE       2,338,379
CONTROL MECHANISM FOR AIRCRAFT
Filed Nov. 16, 1939       2 Sheets-Sheet 1
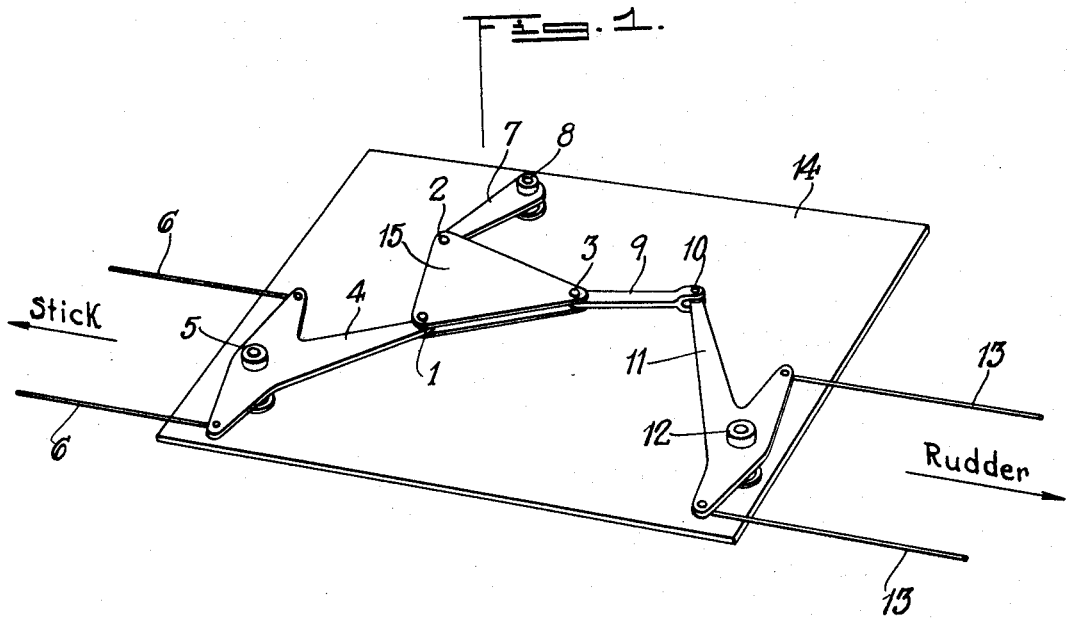
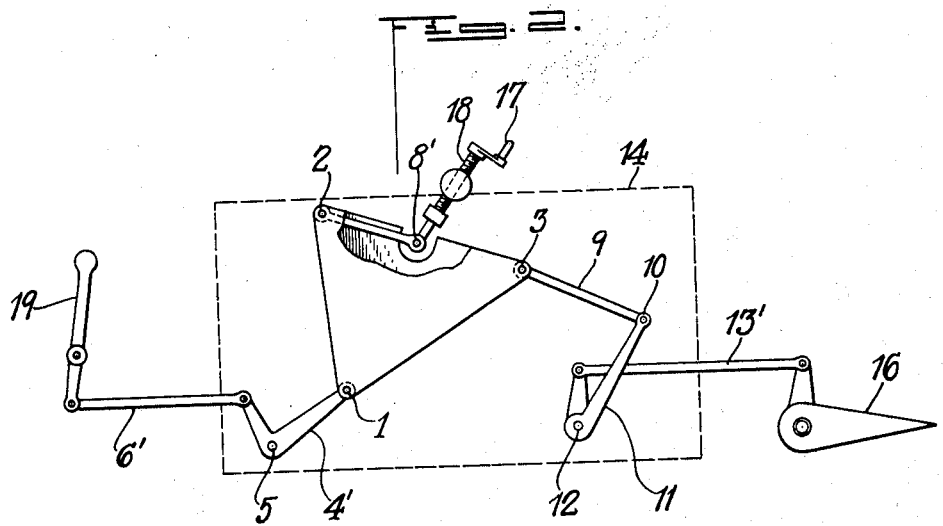
INVENTOR.
KARL HENKE.
BY Karl A. Mayr.
ATTORNEY.

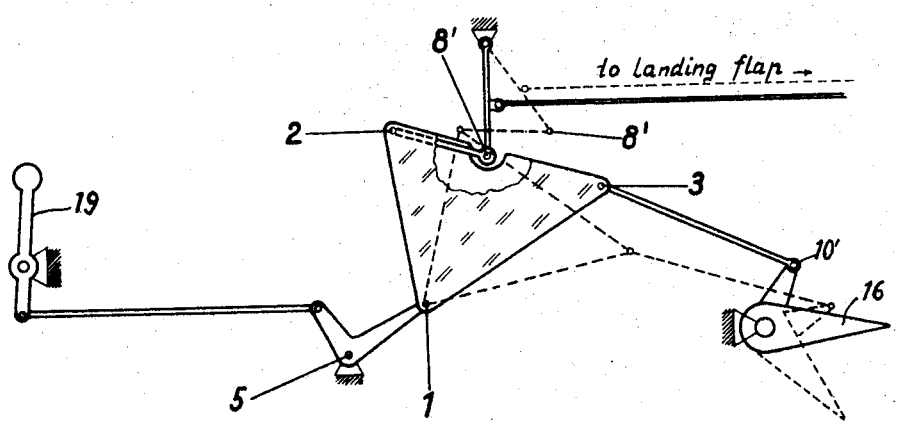

Patented Jan. 4, 1944

2,338,379

UNITED STATES PATENT OFFICE 2,338,379

CONTROL MECHANISM FOR AIRCRAFT

Karl Henke, Bremen, Germany; vested in the Alien Property Custodian

Application November 16, 1939, Serial No. 304,651
In Germany November 17, 1938

6 Claims. (Cl. 74—469)

The present invention relates to a system for operating rudders in aircraft.

Control systems for aircraft have been proposed in which the ratio of transmission between the controlling member, for example, a stick, and the member to be controlled, for example, a rudder, changes automatically in a predetermined manner during operation of the system. It is desirable to make the change of transmission ratio dependent on the deviation of the member to be controlled.

For controlling or steering aeroplanes, it is desirable that, in the neighborhood of the centre or neutral position, comparatively small deviations of the member to be controlled, for example, the rudder, are produced by relatively large movements of the controlling member, for example, the stick, and that in the range of larger deviations or control movements away from the centre or neutral position, the movements of the rudder or the member to be controlled are gradually accelerated, so that at first the movement of the rudder lags behind that of the stick, and when reaching an end position, the movement of the rudder leads that of the stick. There is no linear relation between the movements of the controlling member and the member to be controlled. Various means have been proposed to solve the above set forth problem. The conventional mechanisms inherently have plenty of play and the member to be controlled, for example, the rudder, tends to flutter at certain operating conditions. Slot hole guides and similar means have been proposed; such means are subject to wear and are inferior to the mechanism according to the present invention which is composed of levers.

According to the present invention, the problem is solved by the provision of mechanical movement transmitting means, including a lever mechanism, made of novel construction, which is interposed between the controlling or manipulated member and the member to be controlled.

Further and other objects and advantages of the present invention will be apparent from the accompanying specification and claims and shown in the drawings which, by way of illustration, show what I now consider to be preferred embodiments of my invention.

In the drawings:

Figure 1 is an isometric diagrammatic showing of the mechanism, according to the present invention.

Figure 2 is a diagrammatic top view of a modified mechanism, according to the present invention.

Fig. 3 is a diagrammatic top view of another modification according to the present invention.

Referring more particularly to Figure 1 of the drawings, it will be observed that the mechanism, according to the present invention, does not include gliding members, such as coulisses. The mechanism, according to Figure 1, may be arranged to produce a self-braking and self-locking effect, in the neighborhood of its centre or neutral position, so that movements of the rudder, caused, for example, by wind forces, cannot be transmitted to the stick, although movements of the stick are always effective on the rudder.

The mechanism is preferably mounted on a base plate or suitable casing 14. Three fulcrums, or pins, 5, 8 and 12, are fixed to said base plate. Levers 4, 7 and 11, respectively, of suitable length and configuration, are adapted to swing about said fulcrums.

A substantially triangularly-shaped coupling element 15, carries at its corners articulation pins 1, 2 and 3. Pin 1 is connected to the end of driving lever 4, which swings about pin 5, which is rigidly connected with plate 14. Driving lever 4 may be operated by means of control wires 6, which connect lever 4 with a steering wheel, a stick or the like. Pin 1 swings on an arc. Pin 2 is connected with the end of lever 7 and its distance from fulcrum 8 is maintained at all operating positions so that the movements of the coupling triangle 15, particularly of pin 3, are definitely determined; pin 3, as every other point of triangle 15, moves along so-called coupling curves. To pin 3 one end of pusher rod 9 is movably connected. The other end of pusher rod 9 is articulated to pin 10 at the end of driven lever 11. Pin 10 moves on an arc about fulcrum 12. Control wires 13 or the like are connected with lever 11 and transmit the movements of lever 11 to the member to be controlled, for example, a rudder, an aileron or the like. By suitably arranging size, distance and configuration and location of the individual members of the transmitting mechanism, a great variety of transmission ratios and characteristics can be obtained, so that in spite of the unsymmetric, kinematic arrangement, a symmetric effect is produced as is desired for control systems with which the invention is concerned. A self-braking or self-locking effect, in the neutral position of the system, may be produced by arranging pins 1, 3 and 5, as well as pins 2, 3 and 8, in a straight line, when the system is in neutral or centre position. In the arrangement shown in Figure 1, only the first of the above set forth two conditions are fulfilled, and a self-braking effect is not produced in the system, according to Figure 1.

A self-braking effect is obtained when arranged as in Figure 2. This self-braking arrangement is shown in self-braking position, whereby the rudder or aileron 16 and the system are blocked against actions on the rudder itself. In the mechanism, as shown in Figure 2, instead of control wires 6, or the like, a connecting rod 6' is used, and instead of the substantially T shaped levers 4 and 11, bell crank levers 4' and 11' are used. Instead of connecting wires 13, a connecting rod 13' is employed. Fulcrum 8' of the system, according to Figure 2, is not in fixed position with respect to the base plate 14. The position of fulcrum 8' can be changed, for example, by manipulating the crank 17 of the threaded spindle 18. By changing the position of fulcrum 8', the characteristics of the transmission of the movements of stick 19, with respect to the movements of rudder 16, can be changed while the system is in operation. Adjustment or change of the transmission ratio is desirable, for example, for the operation of transverse rudders or ailerons; when the aeroplane moves at high speed, no great effect of minor movements of the control stick or wheel on the ailerons is needed, whereas a self-locking effect is desirable. On the other hand, when operating at low speed, particularly when the aeroplane floats towards the landing field, the self-locking effect is without importance, whereas it is highly desirable that small movements of the stick produce large movements of the ailerons.

The fulcrum of the auxiliary bearing 8' may be connected to and its position automatically controlled by the landing flaps or similar auxiliaries which are operated when landing. This modification of the invention is illustrated in Figure 3. By means of such an arrangement, the ailerons may be simultaneously used as landing flaps without impairing their controlability to produce the aileron effect; when the position of the control stick 19 is maintained, fulcrum or pin 1 is in fixed position; a change of the position of pin 8' will then cause change of the position of pins 3 and 10', and thereby of the aileron 16. The dotted lines in Figure 3 indicate the position of the various parts of the mechanism when the landing flaps are deflected whereby the ailerons 16 are automatically deflected in the same direction and act also as landing flaps. Operation of the ailerons, however, is still possible and the maneuverability is not impaired, in the contrary, is improved because the effect of the operation of the ailerons can be increased by proper choice of the dimensions of the mechanism.

The size of the mechanism as a whole is unimportant. Pin or driving shaft 5, and pin or driven shaft 12, may be located anywhere in the aircraft. On the other hand the whole mechanism may be built in a comparatively small box and inserted as a complete unit in an existing control mechanism and disposed, for example, in the fuselage bottom or stern, or in the shell of a wing.

While I believe the above described embodiments of my invention to be preferred embodiments, I wish it to be understood that I do not desire to be limited to the exact details of design and construction shown and described, for obvious modifications will occur to a person skilled in the art.

I claim:

1. A system for actuating control members in aircraft, said system comprising a controlling member, a member to be controlled, a mechanism operatively interconnecting said members, said mechanism comprising an unsymmetric articulation quadrangle having a coupling member, two individual arm members swinging about stationary fulcrums and being individually movably connected with said coupling member, one of said arm members being operatively connected with said controlling member, a fulcrum member swingably holding the other of said arms, a position adjusting mechanism connected with said fulcrum member for positively adjusting the position of said fulcrum member, and a connecting member movably connected with said coupling member and with the member to be controlled.

2. A system for actuating control members in aircraft, said system comprising a controlling member, a member to be controlled, a mechanism operatively interconnecting said members, said mechanism comprising an unsymmetric articulation quadrangle having a coupling member, two individual arms swinging about stationary fulcrums and being individually movably connected with said coupling member, one of said arms swinging about a fixed fulcrum and being operatively connected with said controlling member, position adjusting means connected with the fulcrum of the other of said arms for adjustably changing the position of the fulcrum of said other arm, and a connecting member movably connected with said coupling member and connected with and operating the member to be controlled.

3. A system for actuating control means in aircraft, said system comprising a controlling member, a mechanism operatively interconnecting said means and said member, said mechanism comprising a coupling member, two individual arm members swinging about stationary fulcrums and being individually movably connected with said coupling member, one of said arm members being operatively connected with said controlling member, the other of said arm members being operatively connected with one of said control means, another of said control means being operatively connected with said coupling member, said coupling member being solely held in position by said two arm members and said other control means.

4. In an aircraft construction, a system for transmitting a control effect which is originated as a substantially consistent force and which is effective to control the position of a rudder or the like, a leverage assembly comprising a control lever mechanically connected to the source of the control effect, a plate assembly having three pivots arranged in a triangle and having one of the pivots connected to the swinging end of said control lever, a supporting lever for said plate assembly connected at one end to another of said pivots and at the other end to a supporting pivot, a transmitting link connected at one end to the other of said pivots, a control lever having a fixed pivot and a free end connected to the other end of said transmitting link and connected to the rudder or the like, whereby the control effect is varied in accordance with the relative position of said plate assembly and the other elements of the linkage assembly.

5. Apparatus as described in claim 4 wherein the position of the various elements of the linkage assembly at the time the rudder or the like is in its normal position is such as to give a self-locking effect thereby preventing transmission of forces from the rudder or the like to the source of the control effect.

6. Apparatus as described in claim 4 wherein said supporting pivot is mounted on the end of a threaded screw rod which is adjustable in a fixed bushing whereby the position of the supporting pivot is regulated to vary the leverage ratio of the linkage assembly.

KARL HENKE.